United States Patent
Kuhn et al.

(10) Patent No.: US 12,044,330 B2
(45) Date of Patent: Jul. 23, 2024

(54) VALVE AND DEVICE FOR CONTROLLING PRESSURES OF A FLOW MEDIUM

(71) Applicant: Schaeffler Technologies AG & Co. KG, Herzogenaurach (DE)

(72) Inventors: Lukas Kuhn, Puschendorf (DE); Horst Hartmann, Aurachtal (DE); Anton Erhardt, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/783,037

(22) PCT Filed: Nov. 2, 2020

(86) PCT No.: PCT/DE2020/100927
§ 371 (c)(1),
(2) Date: Jun. 7, 2022

(87) PCT Pub. No.: WO2021/115522
PCT Pub. Date: Jun. 17, 2021

(65) Prior Publication Data
US 2023/0019352 A1    Jan. 19, 2023

(30) Foreign Application Priority Data

Dec. 10, 2019   (DE) .......................... 102019133665.1

(51) Int. Cl.
*F16K 31/122* (2006.01)
*F16K 17/04* (2006.01)
*F16K 27/02* (2006.01)

(52) U.S. Cl.
CPC .......... *F16K 31/1221* (2013.01); *F16K 17/04* (2013.01); *F16K 27/02* (2013.01)

(58) Field of Classification Search
CPC .... F16K 15/025; F16K 15/026; F16K 15/063; F16K 31/1221; F16K 17/04; F16K 27/02; F16K 27/0209
See application file for complete search history.

(56) References Cited

U.S. PATENT DOCUMENTS 910,711 A * 1/1909 McCarty ............... F16K 15/026
137/543.23
939,987 A * 11/1909 Dawley ................ F16K 15/026
251/366

(Continued)

FOREIGN PATENT DOCUMENTS

| CN | 1732350 A | 2/2006 |
| CN | 1842671 A | 10/2006 |

(Continued)

OTHER PUBLICATIONS

Parker Oring handbook (Year 2001).

*Primary Examiner* — Daphne M Barry
(74) *Attorney, Agent, or Firm* — Volpe Koenig

(57) ABSTRACT

A valve having at least one valve housing and at least one piston. The valve housing (7) has a hollow-cylindrical first portion (11) with a first diameter (D1) and a second portion (12), connected to the first portion (11), with a second diameter (D2); a first opening (15) is formed on the end face of the valve housing (7) and at least a second opening (16) is formed in the second portion (12); and the first diameter (D1) of the first portion (11) is greater than the second diameter (D2) of the second portion.

17 Claims, 3 Drawing Sheets

(56) References Cited

U.S. PATENT DOCUMENTS

| | | | | |
|---|---|---|---|---|
| 1,150,743 | A | * | 8/1915 | Butts .................... F16K 1/46 |
| | | | | 137/516.29 |
| 1,599,716 | A | * | 9/1926 | Replogle ............ F04B 39/1013 |
| | | | | 137/538 |
| 1,664,043 | A | * | 3/1928 | Niclausse ................ F16K 1/44 |
| | | | | 137/625.36 |
| 1,710,635 | A | * | 4/1929 | Wertz .................. F16K 15/026 |
| | | | | 137/220 |
| 2,085,982 | A | * | 7/1937 | Johnson ................. F23N 1/007 |
| | | | | 137/538 |
| 3,054,422 | A | | 9/1962 | Napolitano |
| 4,161,189 | A | | 7/1979 | Mueller, Jr. |
| 4,682,531 | A | | 7/1987 | Mayer |
| 5,052,433 | A | | 10/1991 | Levenez |
| 5,906,352 | A | | 5/1999 | Post |
| 7,228,869 | B2 | | 6/2007 | Wilhelm |
| 8,043,186 | B2 | | 10/2011 | Gresley et al. |
| 9,004,099 | B2 | * | 4/2015 | Kim .................... F16K 15/025 |
| | | | | 137/513.5 |
| 9,470,295 | B2 | | 10/2016 | Emizu et al. |
| 9,745,928 | B2 | * | 8/2017 | Honda ................. F16K 17/044 |
| 11,126,209 | B1 | | 9/2021 | Weingarten |
| 2005/0103385 | A1 | * | 5/2005 | Takahashi ............. F16J 15/025 |
| | | | | 137/540 |
| 2006/0037647 | A1 | * | 2/2006 | Okuda .................. F16K 15/025 |
| | | | | 137/543.23 |
| 2011/0076171 | A1 | * | 3/2011 | Park .................... F16K 15/026 |
| | | | | 417/571 |
| 2011/0139273 | A1 | * | 6/2011 | Park .................... F04B 27/1009 |
| | | | | 137/535 |
| 2014/0311585 | A1 | | 10/2014 | Rickis |
| 2015/0211500 | A1 | * | 7/2015 | Kumazawa ............ F04B 1/182 |
| | | | | 137/538 |
| 2017/0328316 | A1 | * | 11/2017 | Van Lant ............... F02B 39/16 |
| 2022/0325810 | A1 | | 10/2022 | Morris et al. |

FOREIGN PATENT DOCUMENTS

| | | |
|---|---|---|
| CN | 101025139 A | 8/2007 |
| CN | 103476476 A | 12/2013 |
| CN | 203948754 | 11/2014 |
| CN | 203948754 U | 11/2014 |
| CN | 205859197 U | 1/2017 |
| CN | 107642479 A | 1/2018 |
| CN | 107883051 A | 4/2018 |
| CN | 108019541 A | 5/2018 |
| CN | 108240273 A | 7/2018 |
| DE | 2805040 | 8/1979 |
| DE | 3719354 | 12/1988 |
| DE | 8817172 | 10/1993 |
| DE | 19731557 | 1/1999 |
| DE | 10030250 | 8/2001 |
| DE | 10259205 A1 | 7/2004 |
| DE | 10358429 | 7/2005 |
| DE | 102005025917 A1 | 12/2006 |
| DE | 102006010706 | 9/2007 |
| DE | 102007035706 | 8/2008 |
| DE | 102009025092 A1 | 12/2010 |
| DE | 112016004837 | 7/2018 |
| EP | 0798471 | 10/1997 |
| EP | 3584475 | 12/2019 |
| FR | 1275199 | 11/1961 |
| JP | 2014181765 | 9/2014 |
| JP | 6273093 | 1/2018 |
| WO | 95/33231 A1 | 12/1995 |
| WO | 2020114550 | 6/2020 |
| WO | 2021018341 | 2/2021 |
| WO | 2021115521 | 6/2021 |
| WO | 2022002302 | 1/2022 |

* cited by examiner

VALVE AND DEVICE FOR CONTROLLING PRESSURES OF A FLOW MEDIUM

CROSS-REFERENCE TO RELATED APPLICATIONS

This application is the U.S. National Phase of PCT Appln. No. PCT/DE2020/100927, filed Nov. 2, 2020, which claims priority from German Patent Application No. DE 10 2019 133 665.1, filed Dec. 10, 2019, the entire disclosures of which are incorporated by reference herein.

BACKGROUND

A valve of the type with a stepped valve housing is known from DE 10 2006 010 706 A1. A support element is held in the portion with the larger diameter. A compression spring is supported on the support element. The compression spring is biased against a piston designed as a ball, which is guided in a portion with a smaller diameter. An opening is formed on the end face of the portion with the smaller diameter, which can be closed by the ball. The support element has axial openings. Flow medium can flow into the end face opening and leave the valve at the rear via the axial openings.

SUMMARY

The object of the disclosure is to create a valve which can be used in many different ways.

According to the disclosure, the valve is designed to be stepped in diameter. A hollow-cylindrical first portion and a hollow-cylindrical second portion are formed on the valve housing. The diameter of the first portion is larger than that of the second portion, creating a diameter step on the valve housing. Stepping the diameters advantageously creates at least two mutually independent outer cylindrical functional surfaces, by means of which the application of a valve of the type can be made more diverse. The first portion is provided, for example, for seating the valve in a bore of a component of a transmission. The second portion has at least one transverse opening. This has a positive effect on the application or use of a valve in a vehicle transmission, as described below with another aspect of the disclosure, namely a device for controlling pressures of a flow medium in a component.

One embodiment provides a hollow-cylindrical third portion on the valve housing, which advantageously provides an additional third functional surface. The third functional surface provides additional application possibilities. The hollow-cylindrical third portion surrounds the end face opening of the valve and can serve, for example, as the support base of a seal.

Further embodiments relate to multiple transverse openings arranged on the circumference and/or the orientation of the transverse openings. The above measures can improve the flow behavior in the device. It is also possible, for example, for the transverse openings to be arranged circumferentially and axially offset from one another on the valve housing, and thus the flow behavior can further be positively influenced under certain circumstances. Multiple channels in the component of a device are not necessary, since the flow medium flowing from multiple transverse openings is also initially collected in the annular gap described below.

The device according to the disclosure for controlling pressures of a flow medium in a component is formed at least by the component and a valve. The component is a shaft, alternatively a hub, a housing or any other component, preferably that of a vehicle transmission. The valve is preferably designed to be rotationally symmetrical and has an axially aligned valve axis. The valve is either fully or partially seated in the component. Thus, the valve can also be arranged in two adjacent, nested, or two interconnected or opposing components, preferably of a vehicle transmission. The valve has at least one transverse opening. Alternatively, two, three or more openings distributed on the circumference of the valve are provided. The opening or the transverse openings open into an annular gap at least partially surrounding the valve. The annular gap is formed with radial clearance to the outer contour of the valve. It extends around the valve axis and is preferably larger than the radial wall thicknesses of the valve housing of the valve. The openings are preferably formed in one or more valve housings of the valve in operative connection with one another. The annular gap is formed between the valve and the component. The through-hole in the component, which also extends axially above the guide portion, has the same nominal diameter as the seating portion of the valve housing on the outside. This creates the annular gap around the circumference of the guide portion. Accordingly, the through-hole in the component can simply be drilled as a through-bore. The through-hole or through-bore is designed to be continuous with the same diameter over at least an axial portion of an axial length in one direction, wherein the length of the portion corresponds to that of the valve with the seating portion and the guide portion in the same axial direction. The channel of the component opens into the annular gap.

Generally, the passage of the flow medium is axial. This means that the flow medium flows into an end face opening of the valve and leaves the valve at the rear. The flow medium is, for example, oil, preferably gear oil. However, there are also devices in which pressures of the flow medium or the direction of flow of the flow medium between a longitudinal and a transverse channel must be controlled. This means that the valve has a longitudinally oriented opening and at least one transversely oriented opening. In this regard, "transverse" is seen in radial direction to the axially aligned valve axis. Mounting such valves in the device or component is relatively complicated, since the transverse opening must be precisely aligned with respect to the transverse channel so that their flow cross-sections coincide in such a manner that the flow medium can flow unimpeded through the opening into the transverse channel or vice versa. The problem with this is that even a slight inadvertent rotation of the valve about its own axis can create a circumferential offset between the passage cross-sections of the opening and the channel, creating the risk that not enough flow medium can pass through.

Means would therefore have to be found to align the valve exactly in its position during assembly to provide the necessary correspondence between the flow cross-sections of the transverse channel and the transversely aligned opening in the valve.

By stepping the valve housing, it is possible, on the one hand, to both press in the valve without additional machining of the component in a through-bore or blind hole and, on the other hand, to also create an annular channel between the valve and the component without having to additionally machine the component for this purpose. By creating an annular gap around the valve in the area of the transversely aligned openings, a position-oriented assembly is advantageously no longer required. The flow medium first leaves the valve at one or more openings and is collected in the annular channel and only then fed into one or more transverse channels. The corresponding transverse channel can then open into the annular channel at any point, and even be axially offset from the transverse opening.

According to one embodiment, the annular gap is sealed with at least one seal. In contrast to the known background of the art, the valve is provided with one or more openings which open into an annular gap. According to one embodiment, it has at least one seal with which the annular gap is sealed.

According to one embodiment, the seal is formed of at least a sealing ring and a reinforcement. At least part of the reinforcement covers the annular gap partially or completely in the radial direction, i.e., transverse to the valve axis. On the one hand, the reinforcement can thus advantageously form a gap seal between the valve and an inner contour of a component, and on the other hand, the seal, the preferably sealing main component of which is a more or less elastic element, is rigidly supported by means of the reinforcement. The elastic element is, for example, a sealing ring made of any sealing material, such as an elastomer. The sealing ring can also consist of one or more sealing lips and/or can be formed of similar or different materials. In conclusion, another advantage of the reinforcement is that it can be used as a base and carrier for various sealing variants. Since the valve cannot always be supported in a blind hole or against an annular shoulder, the annular gap between the valve and a hole containing the valve seat is relatively wide. Accordingly, the seal must also be generously dimensioned radially. Since the seal is essentially made of elastic material, it may deform in a yielding manner at high pressures of the flow medium and lose its sealing effect or even slip into the annular gap. The reinforcement according to the disclosure prevents this. In addition, bores with blind holes or annular shoulders are relatively complex to manufacture, especially when seats for such valves have to be ground internally.

The reinforcements are easy and inexpensive to produce, especially in bulk. They are made of sheet metal or alternatively plastic. One embodiment provides that the reinforcement is designed to be rotationally symmetrical about the valve axis. A further embodiment provides that the reinforcement has a leg viewed in a longitudinal section along the valve axis and extending radially outward in the direction away from the valve axis. It follows from this that the leg is formed by an annular disc portion aligned concentrically with the valve axis and extending circumferentially around the valve axis. This annular disc portion partially or completely covers the annular gap radially. The sealing ring is axially supported at this annular disc portion and, despite its elastic property, is held in position even at high pressures. The advantage of this embodiment is that the radial dimensions of the annular gap can be as large as desired. Only the radial length of the leg (the radial dimension of the annular disc portion) must be adjusted.

According to one embodiment, the reinforcement comprises a hollow-cylindrical collar. This collar is formed integrally with the leg. The reinforcement is placed on or guided around a neck of the valve with this collar, guiding it radially on the valve. The neck, which is also hollow-cylindrical, surrounds an inlet opening of the valve, for example. The seal is guided radially over the collar on the neck and the leg or annular disc portion extends radially away from the collar beyond the outer contour of the valve at this point and into the annular gap. The sealing ring of the seal is attached to or axially supported on the annular disc portion and seals the annular gap.

A valve for a device according to the disclosure is also provided, which is provided with at least one piston guided inside the valve housing. In addition, the piston can be axially spring-biased against a sealing seat of the valve housing or against a sealing seat inserted separately in the valve housing. The spring is axially supported on a support element of the valve. The piston is guided axially movably in the valve housing to control the passage cross-sections of the openings.

The valve comprises the valve housing, the piston and a spring. The valve housing and the piston are designed to be essentially rotationally symmetrical and are arranged coaxially to the valve axis. The piston is preferably axially movable but preferably radially closely guided in the valve housing with little radial play and is provided with a piston casing and a piston base. The piston casing is designed as a hollow cylinder and is oriented coaxially to the valve axis and extends from the piston base toward one end of the valve housing. The valve housing and the piston are sleeve-shaped components which are preferably cold-formed from flat sheet metal material, i.e., drawn and punched. The spring is a compression spring and is supported axially in one direction on the piston base of the piston and in the other axial direction on the end of the valve housing on a support element. The spring is axially clamped between the piston base and the support element.

The base body of the support element optionally also serves as an axial support and radial centering as well as a guide for the spring. The circumferential groove is preferably made by narrowing a hollow-cylindrical end of the valve housing. The hollow-cylindrical end has a reduced wall thickness compared to the regular wall thickness of the valve housing. The narrowing is achieved by cold forming. This creates the circumferential groove, which is axially delimited in one direction by the narrowing and, in the other direction, by the regular wall of the valve housing. The base body optionally serves preferably as an axial support and radial centering as well as a guide for the spring.

The valve can be pre-assembled with the device according to the disclosure to form an assembly unit. Advantageously, the collar is pressed onto a neck of the valve or elsewhere onto the valve housing. Such an assembly unit reduces the effort required for transport and storage of the valve or seal.

BRIEF DESCRIPTION OF THE DRAWINGS

The disclosure is explained in more detail below by means of exemplary embodiments. In the figures.

DETAILED DESCRIPTION

Figure 1:
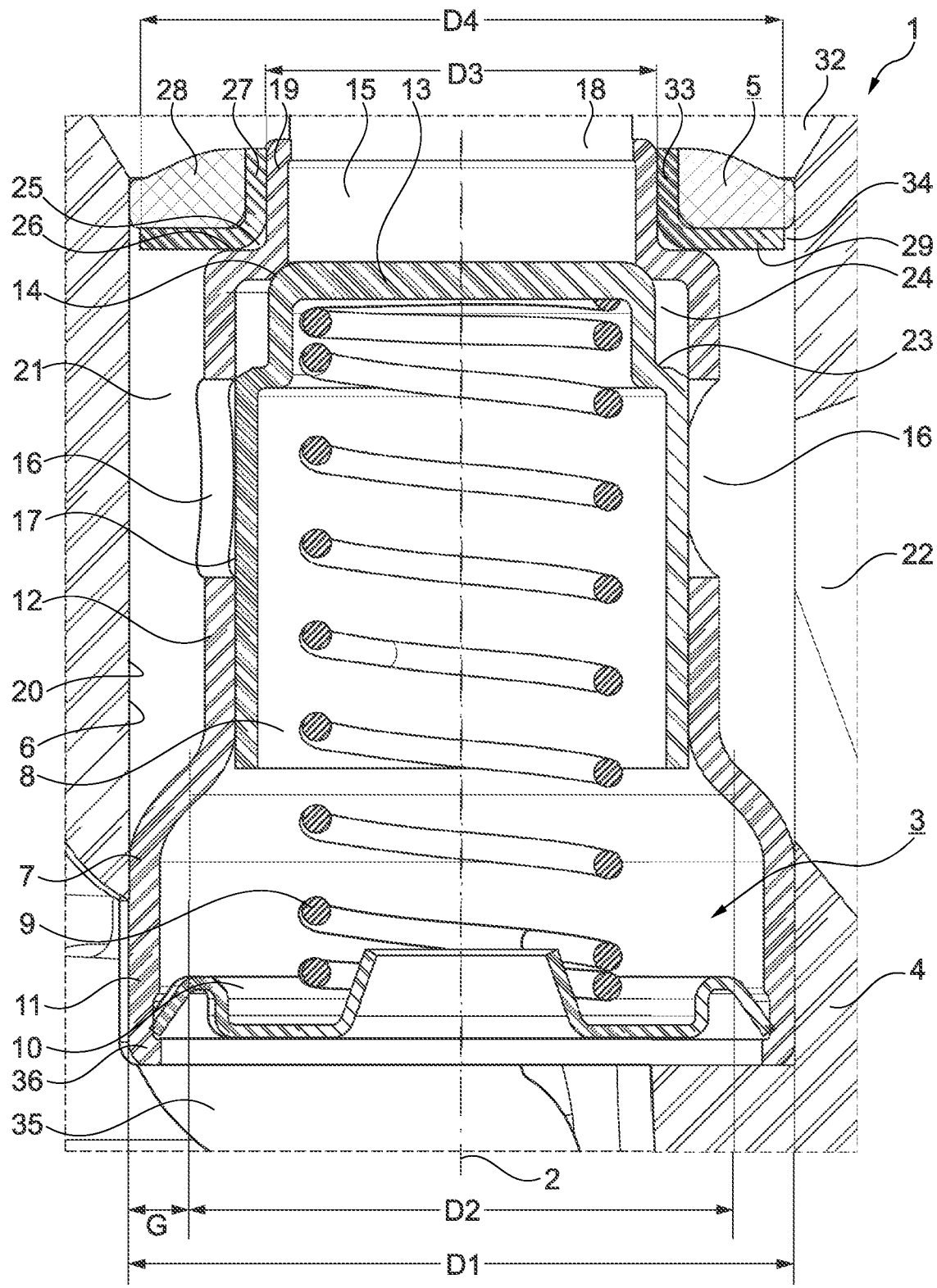
FIG. 1—shows a device 1 for controlling pressures of a flow medium in a longitudinal section along a valve axis 2 of a valve 3.

Referring to FIG. 1, the device 1 is formed by an only partially shown component 4, the valve 3 and by a seal 5.

The valve 3 is seated in a through-hole 6 of the component 4. The component 4 is, for example, a gearbox housing or a rotating component of a gearbox and consists, for example, of an aluminum alloy or alternatively of steel.

The valve 3 consists of a valve housing 7, a piston 8, a compression spring 9 and a support element 10. The valve axis 2 is axially oriented. Radial means transverse to the valve axis 2. The valve housing 7 has a first portion 11 configured as a seating portion, using which the valve 3 is centered in the through-hole 6 of the component 4. The piston 8 is axially guided in a second portion 12 of the valve housing 7, which is designed as a guide portion for the piston 8. The support element 10 is firmly seated in the valve housing 7 at the end of the valve housing 7. The compression spring 9 is axially supported on a piston base 13 of the piston 8 and axially clamped between the piston base 13 and the support element 10 in a resilient manner. In a closed position shown in FIG. 1, the piston 8 is biased against a valve seat 14 by the action of the compression spring 9. In this closed position, a frontal first opening 15 of the valve housing 7 is closed by means of the piston 8. The first opening 15 is axially equally aligned with the valve axis 2.

Second openings 16 are formed in the valve housing 7, which are radially opposite a piston casing 17 of the piston 8. The second openings 16 are directed radially towards the valve axis 2 transversely to the axial direction. A first channel 18 and the first opening 15 for flow media are aligned in a permeable manner with respect to one another. A third hollow-cylindrical portion 19 formed on the valve housing 7 surrounds the first opening 15. The second portion 12 of the valve housing 7 extends axially from the first portion 11 to the third portion 19. A third channel 35 optionally connects to the valve 3 at the end 36, depending on the design of the valve 3.

Radially between the second portion 12 and an inner lateral surface 20 of the through-hole 6, a annular gap 21 is formed around the valve housing 7 and thus around the valve axis 2. The thickness G of the annular gap 21 results from the difference of the diameters D1 and D2, wherein D1 is the diameter of the through-hole 6 at the seat of the first portion 11 in the through-hole 6. At other locations, the through-hole 6 can have other diameters. D2 is the outer diameter of the second portion 12. The second openings 16 open into the annular gap 21. A second channel 22 leads into the annular gap 21. The outer diameter of the first portion 11 and the inner diameter D1 of the through-hole 6 are at least partially equal in the nominal dimension in the area of the first portion 11, wherein a difference in diameter results, where applicable, from a clearance or transition fit or from an interference fit between the first portion 11 and the through-hole 6.

The piston 8 is a hollow-cylindrical component, which is designed to be stepped in diameter. The first step 23 of the piston 8 is formed between the piston casing 17 and the piston base 13. The piston base 13 has a smaller diameter than the piston casing 17, resulting in an annular channel 24 at the step 23 inside the valve 3. The annular channel 24 is formed between the first opening 15 and the second openings 16.

The outer diameter D3 of the hollow-cylindrical third portion 19 is smaller than the outer diameter D2 of the second portion 12, resulting in a step 25 on the valve housing 7. The seal 5 is guided radially on the hollow-cylindrical third portion 19 via a reinforcement 27 of the seal 5 and is axially supported on an annular surface 26 of the step 25. The seal 5 further comprises at least one sealing ring 28. The reinforcement 27 and the sealing ring 28 are either firmly connected to one another, for example by vulcanization, or the sealing ring 28 rests axially on the radially aligned leg 29 of the reinforcement 27. The outer diameter D4 of the reinforcement 27, determined by the outer edge of the disc-shaped leg 29, is smaller than or equal to the inner diameter D2 of the through-hole 6, formed as a through-bore, at the point where the valve 2 is seated with the first portion 11 in the through-hole 6. In addition, the outer diameter D4 of the reinforcement 27 is larger than the outer diameter D2 of the second portion 12. This results in the following relation: D2<D4≤D1. The reinforcement 27 is rigidly guided radially via a collar 33 on the third portion 19 and at the same time is rigidly supported with the leg 29 on the annular gap 26 and thereby projects radially with the leg 29 beyond the outer lateral surface 30 of the valve housing 7 and at the same time at least partially bridges the annular gap 21 radially. The collar 33 is hollow-cylindrical and integrally connected with the leg 29 to the reinforcement 27. The sealing ring 28 is radially squeezed between the collar 33 and an inner lateral surface 31 in the through-hole 6 and is clamped in axial directions between a cover 32 and the leg 29.

The sealing ring 28 can, where applicable, also bridge a gap 34 formed between the leg 29 and the inner lateral surface 31. The sealing ring 28 is supported axially in the direction of the annular gap 21 by the leg 29 in such a manner that it comes to rest securely against the inner lateral surface 31 and is not drawn into or slips into the annular gap 21 and loses its sealing effect.

Figure 2:
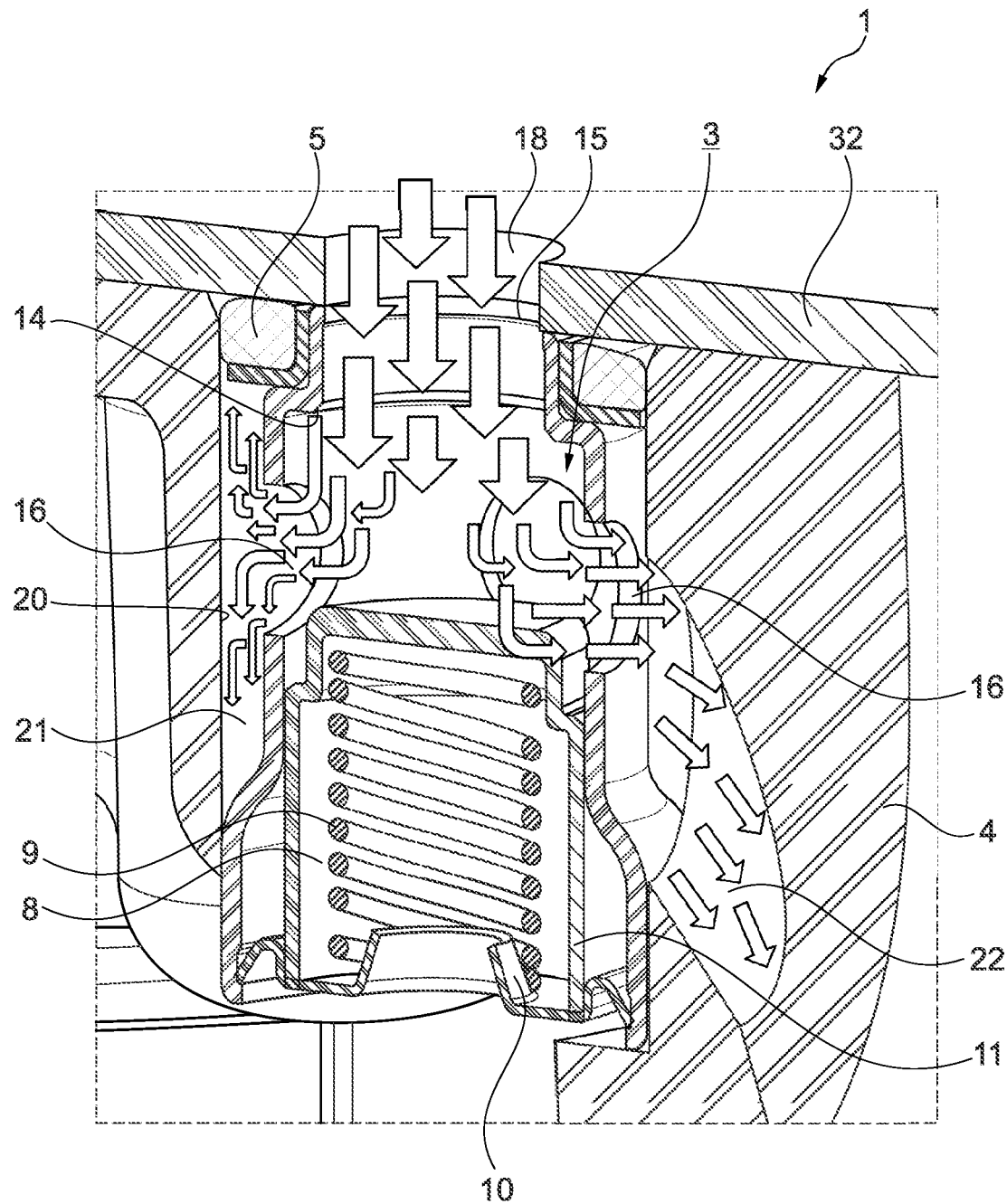
FIG. 2—shows a sectional three-dimensional view of the device according to FIG. 1.

In FIG. 2, the piston 8 is in an open position. The flow medium symbolized by the arrows is initially in contact with the piston 8 in the first channel 18 under pressure in the closed position shown in FIG. 1. When the pressure exceeds a certain limit, the piston 8 lifts off the valve seat 14 and is displaced axially in the direction of the support element 10 against the action of the compression spring 9. The first opening 15 is released. The flow medium passes through the interior of the valve 3 and leaves it via the second openings 16, flows into the annular gap 21 formed between the inner lateral surface 20 and the valve 3, and from there into the second channel 22. The annular gap 21 is axially sealed (closed) in one direction on the end face of the valve 3 by means of the seal, so that no flow medium can escape between the cover 32 and the housing of the component 4, and is closed in the other direction by the seat of the first portion 11 of the valve housing 7 in the component 4.

Figure 3:
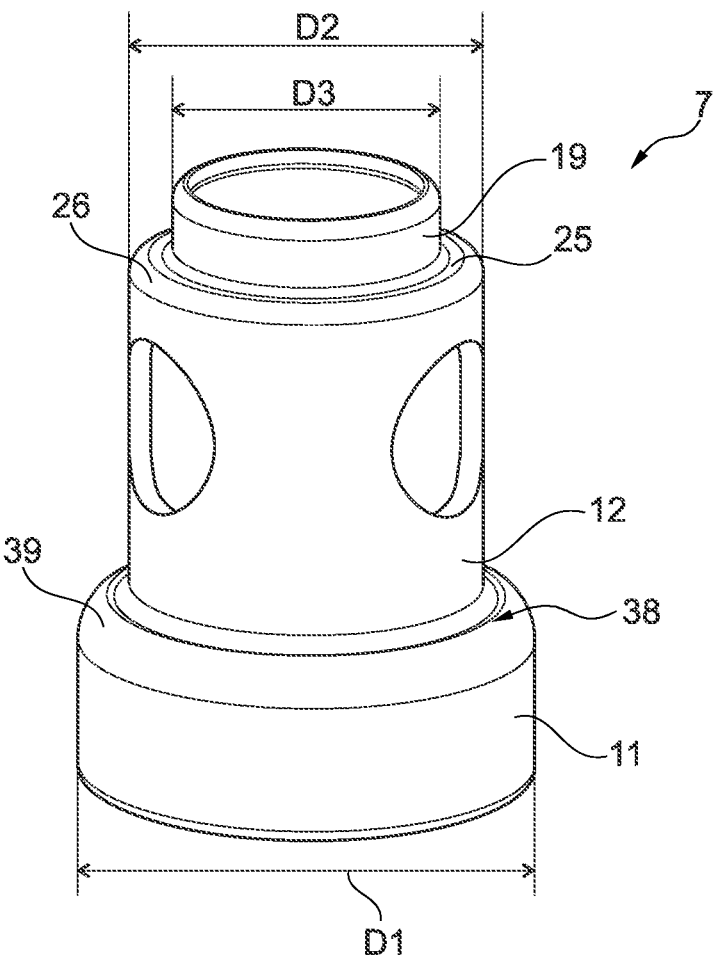
FIG. 3—shows an overall view of a valve housing 7, e.g., that of valve 3.

Referring to FIG. 3, the valve housing 7 is double stepped and has a hollow-cylindrical first portion 11, a hollow-cylindrical second portion 12, and a hollow-cylindrical third portion 19. The second portion 12 of the valve housing 7 extends axially from the first portion 11 to the third portion 19. The three portions 11, 12 and 19 have diameters D1, D2 and D3 that differ from one another.

D1 is the outer diameter of the first portion 11. D2 is the outer diameter of the second portion 12 and D3 is the outer diameter of the third portion 19. The first step 38 is formed between the first portion 11 and the second portion 12 because the diameter D1 of the first portion 11 is larger than the diameter D2 of the second portion 12. This results in the radial first step 38 between the first portion 11 and the second portion 12 via an end face annular portion 39. The annular portion 39 is designed to be dome-shaped.

The outer diameter D3 of the third portion 19 is smaller than the outer diameter D2 of the second portion 12, resulting in a second step 25 on the valve housing 7. The result is the radial second step 25 via the annular portion 26.

Figure 4:
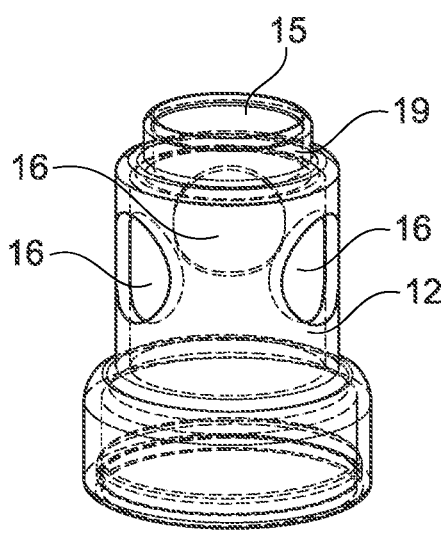
FIG. 4—shows a schematic representation of the valve housing 7 according to FIG. 3, showing the hole pattern and the distribution of the openings 15 and 16 on the valve housing 7, and FIG. 5—shows a further exemplary embodiment of a valve housing 37, which can be installed in a valve 3 or in a device 1 as an alternative to the valve housing 7 and which has a modified hole pattern compared to the valve housing 7.

Referring to FIG. 4, the first opening 15 is surrounded by the third portion 19 formed on the valve housing 7. Three second openings 16 are formed in the second portion 12 of the valve housing 7, which are formed with uniform separation, i.e., each offset from the other by an angle of 120°, distributed around the circumference.

Figure 5:
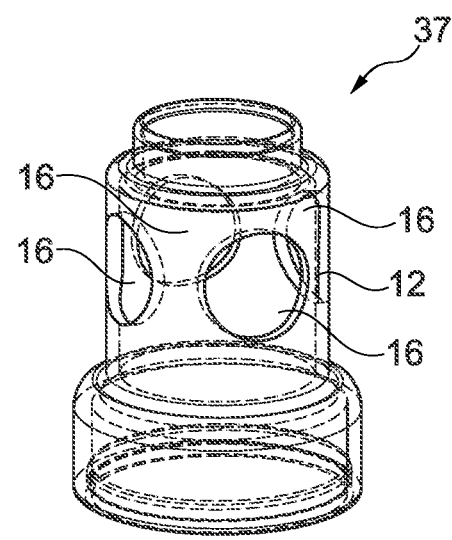

Referring to FIG. 5, four second openings 16 are formed in the second portion 12 of the valve housing 37, which are formed with uniform separation, i.e., each offset from the other by an angle of 90°, distributed around the circumference.

LIST OF REFERENCE SYMBOLS

1 Device
2 Valve axis
3 Valve
4 Component
5 Seal
6 Through-hole in the component
7 Valve housing
8 Piston
9 Compression spring
10 Support element
11 First portion of the valve housing
12 Second portion of the valve housing
13 Piston base of the piston
14 Valve seat
15 First opening
16 Second opening
17 Piston casing of the piston
18 First channel
19 Third portion
20 Inner lateral surface of the through-hole
21 Annular gap
22 Second channel
23 Step of the piston
24 Annular channel
25 Second step of the valve housing
26 Annular surface
27 Reinforcement of the seal
28 Sealing ring of the seal
29 Leg of the reinforcement
30 Outer lateral surface of the valve
31 Inner lateral surface of the through-hole
32 Cover
33 Collar of the reinforcement
34 Gap
35 Third channel
36 End of the valve
37 Valve housing
38 First step of the valve housing
39 Annular portion

The invention claimed is:

1. A valve comprising:
a valve housing including:
a hollow-cylindrical first portion with a first outer diameter;
a hollow-cylindrical second portion connected to the hollow-cylindrical first portion, the hollow-cylindrical second portion having a second outer diameter that is less than the first outer diameter of the hollow-cylindrical first portion;
a hollow-cylindrical third portion connected to the hollow-cylindrical second portion, the hollow-cylindrical third portion having a third outer diameter that is less than the second outer diameter of the hollow-cylindrical second portion; and a first opening formed on an end face of the valve housing and at least one second opening formed in the hollow-cylindrical second portion, wherein the hollow-cylindrical third portion surrounds the first opening, and the hollow-cylindrical third portion merges with the hollow-cylindrical second portion; and
a piston located in the valve housing.

2. The valve according to claim 1, further comprising multiple of the second openings distributed on a circumference of the hollow-cylindrical second portion.

3. The valve according to claim 2, wherein at least some of the second openings are distributed adjacent to one another with uniform separation on the circumference of the hollow-cylindrical second portion.

4. The valve according to claim 2, wherein some of the second openings are axially offset from one another.

5. The valve according to claim 1, wherein at least two steps are formed on an outer circumference of the valve housing, at which in each case two of the hollow-cylindrical portions of the valve housing merge radially into one another.

6. The valve according to claim 1, further comprising a seal guided on the hollow-cylindrical third portion.

7. The valve according to claim 1, wherein the piston is axially movably guided in the hollow-cylindrical second portion.

8. A device for controlling pressures of a flow medium in a component, the device comprising:
the component; and
the valve according to claim 1, wherein the valve has an axially aligned valve axis and is at least partially seated in the component and the at least one second opening opens into an annular gap at least partially surrounding the valve, the annular gap being formed between the valve and the component.

9. The device according to claim 8, wherein the annular gap is sealed with at least one seal.

10. The device according to claim 9, wherein a first channel and the first opening are fluidically connected to one another and a second channel opens into the annular gap.

11. A valve comprising:
a valve housing having a hollow-cylindrical first portion with a first diameter, a hollow-cylindrical second portion, connected to the hollow-cylindrical first portion, with a second diameter that is less than the first outer diameter of the hollow-cylindrical first portion, and a hollow-cylindrical third portion connected to the hollow-cylindrical second portion, the hollow-cylindrical third portion having a third outer diameter that is less than the second outer diameter of the hollow-cylindrical second portion;
a first opening formed on an end face of the valve housing and at least one second openings formed in the hollow-cylindrical second portion, wherein the hollow-cylindrical third portion surrounds the first opening, and the hollow-cylindrical third portion merges with the hollow-cylindrical second portion;
the first diameter of the hollow-cylindrical first portion is greater than the second diameter of the hollow-cylindrical second portion; and
a piston located in the valve housing that is axially movable to open and close the at least one second opening.

12. The valve according to claim 11, further comprising multiple of the second openings distributed on a circumference of the hollow-cylindrical second portion.

13. The valve according to claim 12, wherein at least some of the second openings are distributed adjacent to one another with uniform separation on the circumference of the hollow-cylindrical second portion.

14. The valve according to claim 12, wherein some of the second openings are axially offset from one another.

15. The valve according to claim 11, wherein at least two steps are formed on the valve housing, at which in each case two of the hollow-cylindrical portions of the valve housing merge radially into one another.

16. The valve according to claim 11, further comprising a seal guided on the hollow-cylindrical third portion.

17. The valve according to claim 11, the piston is axially movably guided in the hollow-cylindrical second portion.

\* \* \* \* \*